March 24, 1931.  C. J. KOTCHI  1,797,289
COMPOSITE WELDING WIRE OR ROD MATERIAL
Filed Jan. 10, 1927
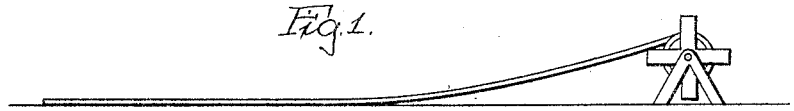
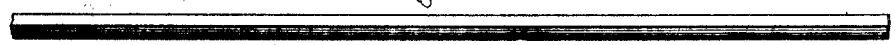
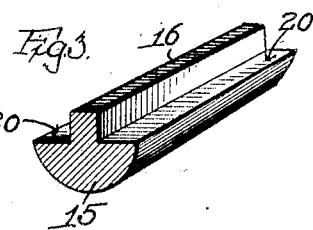
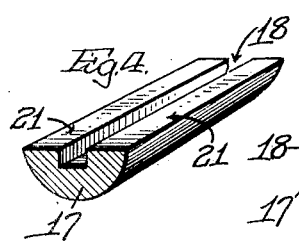
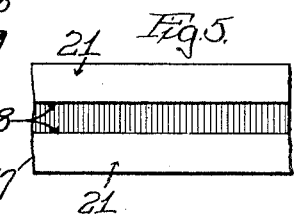
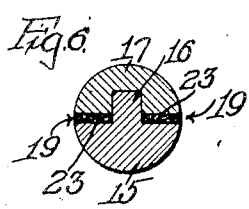
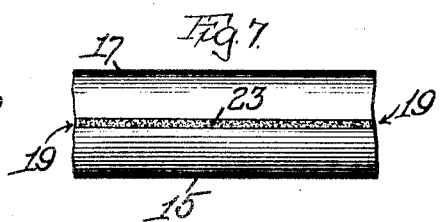
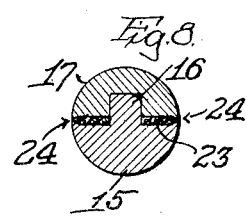
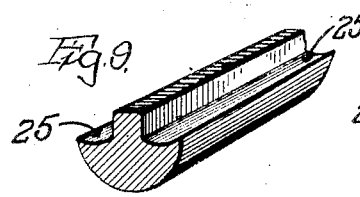
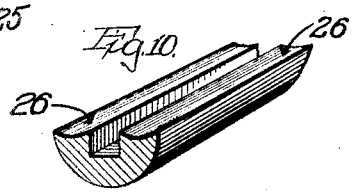
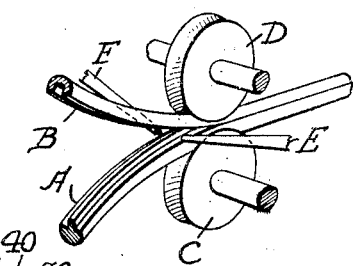
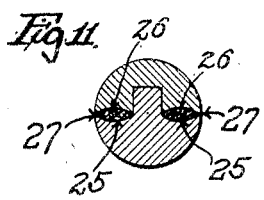
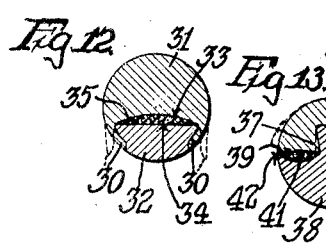

Patented Mar. 24, 1931

1,797,289

UNITED STATES PATENT OFFICE

CHARLES J. KOTCHI, OF CHICAGO, ILLINOIS, ASSIGNOR, BY MESNE ASSIGNMENTS, TO KORO CORPORATION, OF WAUKEGAN, ILLINOIS, A CORPORATION OF ILLINOIS

COMPOSITE WELDING WIRE OR ROD MATERIAL

Application filed January 10, 1927. Serial No. 160,245.

While there may be other applications for composite wire or rod material of the character herein described, this wire has its most important relation to the art of welding, and more specifically to welding material, meaning thereby the fusible material which constitutes the bond between the welded parts.

Ordinary solder is such a bonding agent, but the present wire or rod is designed principally for welding material of the harder and more refractory kinds such as are used in connection with the oxy-acetylene torch or the like and electric welding machines.

The materials employed for such welding are both ferrous and non-ferrous and to a considerable extent consist of hard alloys which may contain several of such ingredients as iron, nickel, chromium, magnesium, tungsten, phosphor bronze, etc.

Welding material has long been on the market in single wire or rod form, and such wires and rods have sometimes been coated with flux. Composite welding rods or bars have also been suggested, including a flux held within the body of the material.

In the use of welding material of the kind herein referred to, whether new or old, the material is first cut to a suitable length, and the gas torch or electric arc, as the case may be, causes the end portion of the wire or rod, applied to the work, to melt and flow.

It may be observed that different kinds of work require different kinds of welding material. Hardness in some instances is a prime consideration. In others tenacity or toughness are of greater importance. Sometimes the color of the welding material may be important. In other cases the melting point may be fairly critical, as where only a limited amount of heat may be employed with safety to the work being operated upon. The character of the wire or rod itself as to stiffness and as to electrical conductivity are sometimes considerations.

These and various other features of a practical nature show that without greatly improved conditions, or invention in the structure, it would be practically impossible to supply, as commercial articles, the very considerable number of kinds of welding material of such general type having so many different characteristics.

To explain further I will state that many efforts have been made to devise new and useful metalliferous compounds for welding purposes, and such compounds have been formed into wires and rods. Several such compounds are now on the market. It would always be feasible to make new compounds in the crucible and form the mass into wires and rods, but this process is not practical from the commercial standpoint, nor is it feasible from the standpoint of cost to have such alloys made up in relatively small quantities, the cost being prohibitive except in what would probably be at least a carload lot. Furthermore, in order that the greatest advantage of diversity in characteristics might be obtained, such a considerable number of different alloys would be required, each obtainable only at great expense, that its practice would be prohibited by the investment involved.

It is possible to buy in the open market, and at very reasonable prices, many different kinds of wires and rods respectively suitable as an element in making wire or rod for welding. According to the present invention such appropriate ones of the commercial material in wire and rod form are selected and severally re-formed into shapes whereby they may be brought together and mechanically combined into a single piece, and thereby such a mechanical association made of the different elements that when the fusing operation takes place the desired alloy is formed in situ; and a feature of the invention includes also the provision of means within the body of the composite material for holding a flux in dry form, together with a flux in such holding means, the flux being preferably in the form of one or more continuous bodies extending in a channel or channels from end to end of the composite material.

It is apparent that according to this invention one may readily and cheaply provide on short notice substantially any desired combination of fusible metals suitable for the purpose, and in the form of wire or rod material, and that a group of such items may be provided to be carried in stock whereby materials having severally a large variety of mechanical and metallurgical characteristics may be always available.

I thus attain the important objects of a cheap and commercial welding wire or rod which may have advantageous characteristics not otherwise obtainable within the limits of permissible cost, and the advantages of many different kinds and varieties of such material, each producible at low cost, whereby a suitable material for a large variety of operations may readily be had; of providing a means whereby particular specifications of a particular user as to characteristics of the material may readily be met, in small or large quantities as desired, in a brief space of time, with little labor and at low cost; to provide a form of wire or rod according to which the flux in suitable quantities is safely and securely maintained within the body of the material, always available for use, and free of the objections of outside coating, and to have such flux in dry form.

Having the flux immediately associated with the wire or rod is a great advantage, but when it is applied on the outside much of it is burned away and its efficiency destroyed before the metal to which it has been applied is melted in the welding operation. There are difficulties also attending its application to and maintenance upon the outside of the rod. It is objectionable to the touch, and in electric welding it inhibits the flow of current unless the surface at the contacts is free or freed of the flux.

Still other objects and advantages will appear hereinafter.

In the drawings, Figure 1 is a view showing my present wire as it may appear coiled upon a drum or reel, indicating that the wire is in the form of material adapted to be cut into lengths for use, and that it is producible as a continuous operation to any desired extent; Fig. 2 shows in fragment what may be designated a rod of the same material, being of larger diameter and of any convenient length; Figs. 3 and 4 are greatly enlarged fragmentary perspectives of the two members of my composite material in a simple form, while Fig. 6 shows in sectional view these two members brought together, with flux in channel-like spaces between portions of the body members; Fig. 5 is a view looking directly into the recess of the device of Fig. 4; Fig. 7 is a side view of the combined structure of Fig. 6; Fig. 8 shows the structure of Fig. 6 with edge material of the body members swaged over to inclose the flux; Figs. 9, 10 and 11 are views respectively similar to Figs. 3, 4 and 6 showing a modification in the channel formation, and how the opposed outer edges of the body members come together to close the flux channels respectively; Fig. 12 is a similar sectional view of a modified form of composite structure; Fig. 13 is a sectional view showing how the rib-and-groove parts may be locked together still more strongly than in such a form as in Fig. 6; and Fig. 14 is a diagrammatic fragmentary view showing how the two body members may be rolled and pressed together while flux is introduced into the flux channel or channels.

In making any of the forms of the two body members thus illustrated I employ rolls having the proper configuration. The shape of the form being given, no instructions are required as to the shape of the forming surfaces in the rolls. The outer configuration of the rod or wire will preferably be substantially circular as shown, but may be of any desired shape.

Turning to Fig. 3 the body member 15 is substantially semi-circular in cross view and has an integral rib or vane-like projection 16 radially directed, positioned substantially midway between the side edges, and extending continuously in the longitudinal direction of the long and slender body member. Fig. 4 shows the female member 17 adapted to coact with the structure of Fig. 3. It is provided with a radially directed trough-like recess 18, also substantially midway between the side edges and also extending longitudinally of this long and slender piece. The projection 16 is somewhat higher than the recess 18 is deep whereby when the parts are forced together as in Fig. 6, a narrow space at 19 occurs, which space may vary in thickness as desired, but which in wires of say one-eighth of an inch in diameter, needs to be only say eight or ten one-thousandths of an inch in thickness to contain the desired amount of flux.

The sides of the projection 16 are preferably on straight lines directed outwardly at right angles to the flat surfaces 20, except that at the free end the corners are rounded somewhat for ready entrance into the groove 18. The side walls of the recess 18 are on straight lines perpendicular to the flat surface 21 and the bottom is preferably on straight lines at right angles to the side walls mentioned. The rib-like projection or vane 16 is slightly wider than the recess 18—say several one-thousandths of an inch whereby, when the parts are assembled as in Fig. 6 and the two body members are forced tightly together the projection and recess will engage each other with a tight fit, which tight frictional engagement holds them strongly and rigidly together. When the parts are thus forced together the free end of the projection is pressed upon so that its metal conforms to the square-cornered shape of the recess.

This assembling and pressing operation is done in my practice between rolls, as illustrated sufficiently by Fig. 14, which rolls conform to the outer configuration of the body members respectively and one roll holds the sides of the member 17 at places lateral of the recess so that spreading of this member may not take place to any substantial extent. The result is that the two body members become locked together very strongly.

Fig. 5, by which we look squarely into the recess 18, shows knurling in the bottom wall. This knurling is produced by corrugations on the forming roll designed for traction effects in the rolling operation and also for locking effects. The top surface of the rib 16 is similarly corrugated or knurled. When the body members are pressed together the free end of the ridge-like projection or vane 16 is pressed tightly against the bottom wall of the recess and the corrugated surfaces interfit with each other. The effect of this is to provide a still better interlock between the two parts.

Turning to Fig. 14 the two body members A and B may be considered to be any two of the body members otherwise herein illustrated. The rolls C and D press the two members tightly together to provide the desired holding effects. The members A and B approach the rolls angularly whereby space is provided between them just before the rolls press the parts together. This space is utilized for the insertion of the flux, and this is accomplished by means of troughs E and F, and which may contain the powdered flux gravitationally flowing. These members E and F may be considered also as nozzles of an air gun. In either case the dry flux material is led or forced into the channels of the composite structure. Preferably the female member will be at the top so that the flux material will not objectionably enter its locking groove.

Figs. 6 and 7 show that the flux material 23 is exposed on each side at the outer periphery of the composite structure. This amount of exposure is so small that it might be considered negligible. However, the flux could become washed out by exposure to the weather. The rolls C and D may be formed to pien or swage the closely adjacent outer edges over, as shown at 24, Fig. 8, thus substantially sealing the material within the body.

Turning to Figs. 9, 10 and 11, the only features to be mentioned as departing from what has been described in connection with Figs. 3 to 7 inclusive is the provision of concave surfaces at 25 and 26 in the members respectively whereby when the members are forced together these channels are closed at 27, Fig. 11

In Fig. 12 two lateral vanes 30 are formed in the member 31 adapted to be pressed into overlapping and holding engagement with the interfitting and inter-engaging member 32, the latter preferably being formed with slight marginal recesses to accommodate the short vanes 30. The facing surfaces at 33 and 34 are spaced apart to accommodate flux indicated as 35. These members may be produced and assembled in rolls as already hereinabove described.

In Fig. 13 I have shown the continuous rib-like vane or projection 36 as tapering on each side to produce greater width at its free end, thus holding the parts together with a positive lock. In forming this member 36 with a constricted neck portion as viewed in cross section the projection is first formed by rolls giving it a rectangular contour, as indicated by the dotted lines 37, which dotted lines indicate also the original shape of the groove in the female member. After passing through the first forming rolls the rib 36 on the member 38 passes between side-pressing rolls having slanting surfaces and giving the projection the shape indicated. The dotted lines 39 show the original contour of the body member 40. In assembling these members one of the rolls in the device of Fig. 14 is so formed as to press inward the sides of the female member 40 so that the original rectangular recess is made to conform to the shape of the projection 36. The flux material 41 is in channels which extend continuously, and which are closed at the marginal edges of the members at 42.

Since the forming and assembling may be done automatically, in a single machine not of a complicated nature, it is evident that my new article of manufacture may be produced very cheaply. It is further evident that one may thus readily provide a large variety of such materials each having its own peculiar characteristics. The proportions of one kind of material to another in the construction may be varied within wide limits by variations in the forms of the members respectively.

In the drawings the respective male and female members may be considered to be of the same metal or alloy or of different metals or alloys.

I contemplate as being included in these improvements all such variations, changes and departures from what is thus specifically illustrated and described as fall within the scope of the appended claims.

I claim:

1. Composite welding wire or rod material comprising a pair of substantially straight, long and narrow welding-metal members side by side, means locking said members together to form a single strand unit and integral co-operating interengaging parts on the members for rigidly holding them together with both members exposed, and flux material within the body of the composite structure.

2. Composite welding wire or rod material comprising a pair of substantially straight long and narrow welding-metal members side by side to form a single strand unit and held rigidly together with both members exposed, and flux material within the body of the composite structure, said flux material being substantially continuous from one end of the composite structure to the other.

3. Composite welding wire or rod material comprising a pair of long and narrow welding-metal members of different properties side by side and secured rigidly together by integral cooperating interengaging parts on the members respectively.

4. Composite welding wire or rod material comprising a pair of substantially straight long and narrow welding-metal members of different properties side by side and secured rigidly together by integral cooperating interengaging and interlocking parts on the members respectively, and flux material carried by the composite structure.

5. Composite welding wire or rod material comprising a pair of long and narrow welding-metal members of different properties side by side and secured rigidly together by integral cooperating interengaging and interlocking parts on the members respectively, and flux material extending substantially continuously from end to end of the composite structure.

6. Composite welding wire or rod material comprising a pair of long and narrow welding-metal members of different properties side by side and secured rigidly together by integral cooperating interengaging and interlocking parts on the members respectively, and flux material carried within the body of the composite structure.

7. Composite welding wire or rod material of the character described comprising a pair of long and narrow welding-metal members in faced relation to each other side by side, formed to interfit with each other, and held rigidly together by the interengagement of interfitting parts.

8. Composite welding wire or rod material of the character described comprising a pair of long and narrow welding-metal members of long and narrow welding-metal members in faced relation to each other side by side, formed to interfit with each other, and held rigidly together by the interengagement of interfitting parts, the formation of the parts providing a channel for flux material within the body of the composite structure.

9. Composite wire or rod material of the character described comprising a pair of long and narrow metal members side by side and secured together by integral vane-like means on one member in tight holding engagement with accommodating parts on the other member, there being a channel for flux material between said members.

10. Composite welding wire or rod material of the character described comprising a pair of long and narrow metal members side by side and secured together by integral vane-like means on one member in tight holding engagement with accommodating parts on the other member, there being a channel for flux material between said members, and flux material in said channel.

11. Composite welding wire or rod material of the character described comprising a pair of long and narrow welding metal members one thereof having rib-like projection means longitudinally extending and the other thereof having accommodating trough-like recess means longitudinally extending and proportioned to accommodate said projection means with a tight fit, the projection means extending into the recess means and the members being held rigidly together by the interfit between said interfitting parts the members being formed to provide two channels for flux laterally of the base of the projection means.

12. Composite welding wire or rod material of the character described comprising a pair of long and narrow welding metal members one thereof having a continuous rib-like projection longitudinally extending and the other thereof having a continuous trough-like recess longitudinally extending and proportioned to accommodate said projection with a tight fit while holding adjacent portions of the members in spaced relation to provide a channel for flux, the projection extending into the recess and the members being held rigidly together by the interfit between the recess and the projection.

13. Composite welding wire or rod material of the character described comprising a pair of long and narrow metal members one thereof having a continuous rib-like projection longitudinally extending and the other thereof having a continuous trough-like recess longitudinally extending and proportioned to accommodate said projection with a tight fit, the projection extending into the recess and the members being held rigidly together by the interfit between the recess and the projection, the formation of said members providing a continuous longitudinal channel for flux material within the body of the composite material.

14. Composite welding wire or rod material of the character described comprising a pair of long and narrow metal members each of substantially half-round form in cross view, one thereof having a continuous integral rib-like projection longitudinally extending and directed substantially radially in cross view, the other thereof having a trough-like recess longitudinally extending, directed substantially radially in cross view, and proportioned to accommodate said projection with a tight fit, the projection extending into the recess and the members being held rigidly together by the interfit between the recess and the projection, the formation of said members providing a channel on each side of said projection, and flux material in each channel.

15. Composite wire or rod material comprising a plurality of long and narrow members of welding-metal material lying alongside of each other, means maintaining said members in strongly interlocked relation to each other to form a single body element, and flux within the body of the composite material and within the periphery of the rod, each of said interlocked members defining portions of the periphery of said body element, said rod having a substantially unbroken periphery with all points of the periphery substantially equi-distant from a common center.

16. Composite wire or rod material comprising a plurality of long and narrow members each of different welding-metal material lying alongside of each other, means maintaining said members in strongly interlocked relation to each other to form a single body element, each of said interlocked members defining portions of the periphery of said body element, said rod having a substantially unbroken periphery with all points of the periphery substantially equi-distant from a common center.

17. A welding rod embodying a pair of independent welding members spaced from each other to form a single strand unit having a channel therebetween and within the periphery of said strand, fastening means securing the members together in fixed and substantially parallel relation, and flux material substantially filling said channel.

18. A welding rod embodying a pair of welding members independent of each other, interengaging means on the members for securing said members together in substantially parallel relation to form a single body unit and for maintaining the members spaced to form a channel therebetween within the confines of the periphery of the rod, and flux material substantially filling said channel.

19. A welding rod embodying a pair of substantially parallel welding members of different welding properties, said members being spaced from each other to form a channel therebetween, interlocking means securing said members together in fixed relation to form a single strand unit, and a flux material substantially filling the said channel.

20. A welding rod embodying a pair of substantially parallel welding members of different welding properties, means integral with the members for securing them together to form a single strand unit and for maintaining the members spaced to form a channel therebetween, and flux material substantially filling said channel.

21. A welding rod having a body comprising a single body element of welding material of different properties, the different welding materials being arranged in clearly defined zones extending lengthwise of the rod, means integral with the parts of the rod for securing them together to form a channel in the rod between the different materials, and flux material filling said channel.

22. A welding rod having a body comprising a single body element of welding material of different properties, the different welding materials being arranged in clearly defined zones extending lengthwise of the rod, means integral with the parts of the rod for securing them together to form a channel in the rod between the different zones and extending from one end of the rod to the other and opening through the periphery thereof, and flux material substantially filling said channel.

23. A welding rod embodying a pair of substantially parallel welding members of different welding properties, means for directly securing said members together to form a single strand unit, a channel formed between the proximate faces of the members and extending throughout the length of the rod, and flux material substantially filling the said channel.

24. A welding rod embodying a pair of substantially parallel welding members of different welding properties, intergengaging means on the proximate faces of the members for securing them together, a channel formed in the rod and opening through the periphery thereof, said channel extending lengthwise of the rod, and flux material substantially filling said channel.

CHARLES J. KOTCHI.